United States Patent
Von Drasek et al.

(10) Patent No.: US 12,111,644 B2
(45) Date of Patent: Oct. 8, 2024

(54) CREPING PROCESS PERFORMANCE TRACKING AND CONTROL

(71) Applicant: Ecolab USA Inc., St. Paul, MN (US)

(72) Inventors: William A. Von Drasek, Oak Forest, IL (US); Gary Samuel Furman, St. Charles, IL (US)

(73) Assignee: Ecolab USA Inc., St. Paul, MN (US)

( * ) Notice: Subject to any disclaimer, the term of this patent is extended or adjusted under 35 U.S.C. 154(b) by 22 days.

(21) Appl. No.: 17/672,027

(22) Filed: Feb. 15, 2022

(65) Prior Publication Data
US 2022/0260979 A1 Aug. 18, 2022

Related U.S. Application Data

(60) Provisional application No. 63/149,727, filed on Feb. 16, 2021.

(51) Int. Cl.
*G05B 19/418* (2006.01)

(52) U.S. Cl.
CPC .......... *G05B 19/41875* (2013.01); *G05B 2219/32368* (2013.01)

(58) Field of Classification Search
CPC .......... G05B 19/41875; G05B 2219/32368
See application file for complete search history.

(56) References Cited

U.S. PATENT DOCUMENTS

| | | | |
|---|---|---|---|
| 1,924,154 A | 8/1933 | Engert et al. | |
| 3,061,944 A | 11/1962 | Kraus et al. | |
| 4,320,582 A | 3/1982 | Klippstein et al. | |
| 4,924,420 A | 5/1990 | Hadley et al. | |
| 5,123,152 A | 6/1992 | Tenkula et al. | |
| 5,179,150 A | 1/1993 | Furman, Jr. et al. | |
| 5,187,219 A | 2/1993 | Furman, Jr. | |
| 5,278,620 A | 1/1994 | Godlove | |
| 5,571,382 A | 11/1996 | Berglund | |
| 5,879,279 A | 3/1999 | Berger et al. | |

(Continued)

FOREIGN PATENT DOCUMENTS

| | | |
|---|---|---|
| CN | 202401341 U | 8/2012 |
| CN | 103194927 B | 5/2015 |

(Continued)

OTHER PUBLICATIONS

International Patent Application No. PCT/US2022/016474, International Search Report and Written Opinion mailed May 27, 2022, 12 pages.

(Continued)

*Primary Examiner* — Thomas C Lee
*Assistant Examiner* — Ameir Myers
(74) *Attorney, Agent, or Firm* — Fredrikson & Byron, P.A.

(57) ABSTRACT

The disclosure is directed to techniques for tracking data associated with a creping process. The techniques include measuring process data, wherein the process data includes vibration data, and wherein measuring process data includes measuring vibration data of a creping blade using one or more vibration sensors. The techniques further include assigning a score for the process data, including assigning a vibration score for the vibration data. The techniques also include generating an index score based on the score for the process data and the vibration score for the vibration data.

32 Claims, 9 Drawing Sheets

(56) References Cited

U.S. PATENT DOCUMENTS

| | | | |
|---|---|---|---|
| 6,139,686 | A | 10/2000 | Trokhan et al. |
| 6,203,962 | B1 | 3/2001 | Itami et al. |
| 6,260,004 | B1 | 7/2001 | Hays et al. |
| 6,275,781 | B1 | 8/2001 | Maness et al. |
| 6,463,775 | B1 | 10/2002 | Kodama et al. |
| 6,579,418 | B2 | 6/2003 | Lindsay et al. |
| 6,615,709 | B1 | 9/2003 | Suomi et al. |
| 6,830,659 | B2 | 12/2004 | Sovijrvi |
| 6,928,370 | B2 | 8/2005 | Anuzis et al. |
| 7,027,953 | B2 | 4/2006 | Klein |
| 7,264,692 | B2 | 9/2007 | Isomets et al. |
| 7,286,964 | B2 | 10/2007 | Kim |
| 7,691,236 | B2 | 4/2010 | Conn et al. |
| 7,850,823 | B2 | 12/2010 | Chou et al. |
| 7,962,086 | B2 | 6/2011 | Kato |
| 8,160,467 | B2 | 4/2012 | Zona et al. |
| 8,781,982 | B1 | 7/2014 | Das et al. |
| 9,194,083 | B2 | 11/2015 | Echeverria Garcia et al. |
| 9,239,549 | B1 | 1/2016 | Ishii |
| 9,404,895 | B2 | 8/2016 | Von Drasek et al. |
| 9,506,192 | B2 | 11/2016 | Johnson et al. |
| 9,518,359 | B2 | 12/2016 | Brauns et al. |
| 9,534,970 | B1 | 1/2017 | Figiel |
| 9,562,861 | B2 | 2/2017 | Von Drasek et al. |
| 9,873,981 | B2 | 1/2018 | Edbauer et al. |
| 10,695,884 | B2 | 6/2020 | Yang et al. |
| 2004/0035540 | A1 | 2/2004 | Laitila et al. |
| 2005/0034831 | A1 | 2/2005 | Beuther et al. |
| 2005/0157327 | A1 | 7/2005 | Nakazato et al. |
| 2006/0090574 | A1 | 5/2006 | Moore et al. |
| 2006/0182451 | A1 | 8/2006 | Shoji et al. |
| 2006/0281191 | A1 | 12/2006 | Duggirala et al. |
| 2007/0125891 | A1 | 6/2007 | Crossley et al. |
| 2007/0127934 | A1 | 6/2007 | Nakazato et al. |
| 2007/0137820 | A1 | 6/2007 | Yasugahira et al. |
| 2008/0013818 | A1 | 1/2008 | Shakespeare |
| 2008/0023168 | A1 | 1/2008 | Conn et al. |
| 2008/0033695 | A1 | 2/2008 | Sahara et al. |
| 2009/0190939 | A1 | 7/2009 | Satoh et al. |
| 2010/0086672 | A1 | 4/2010 | Von Drasek et al. |
| 2010/0299119 | A1 | 11/2010 | Erikson et al. |
| 2012/0073775 | A1 | 3/2012 | Duggirala et al. |
| 2013/0103326 | A1* | 4/2013 | Von Drasek ............ G01N 29/46 702/56 |
| 2015/0075928 | A1 | 3/2015 | Johnson et al. |
| 2016/0340830 | A1 | 11/2016 | Von Drasek et al. |
| 2017/0308802 | A1 | 10/2017 | Ramsy et al. |
| 2019/0120811 | A1 | 4/2019 | Luneau et al. |
| 2019/0152011 | A1* | 5/2019 | Kummari ................. G06N 5/04 |
| 2019/0193946 | A1 | 6/2019 | Devries et al. |
| 2019/0345809 | A1 | 11/2019 | Jain et al. |
| 2020/0103387 | A1* | 4/2020 | Brown ................ G01N 27/404 |
| 2020/0272122 | A1* | 8/2020 | Oikawa ............. G05B 19/4065 |
| 2021/0060720 | A1* | 3/2021 | Feng ........................ G01H 3/00 |
| 2022/0083851 | A1* | 3/2022 | Wascat ................... G06N 3/045 |

FOREIGN PATENT DOCUMENTS

| | | |
|---|---|---|
| DE | 102005052858 A1 | 5/2007 |
| DE | 202009008818 U1 | 11/2009 |
| DE | 102011085220 A1 | 5/2012 |
| FI | 115145 B | 3/2005 |
| GB | 1577664 A | 10/1980 |
| JP | S5609493 A | 1/1981 |
| JP | H11012977 A | 1/1999 |
| JP | 3117936 B2 | 12/2000 |
| JP | 2001523774 A | 11/2001 |
| JP | 2010217512 A | 9/2010 |
| WO | 2004005615 A1 | 1/2004 |
| WO | 2004040983 A1 | 5/2004 |
| WO | 2004113611 A1 | 12/2004 |
| WO | 2011002377 A1 | 1/2011 |
| WO | 2012055897 A1 | 5/2012 |
| WO | 2013156147 A1 | 10/2013 |
| WO | 2019084144 A1 | 5/2019 |
| WO | 2020075191 A1 | 4/2020 |

OTHER PUBLICATIONS

Padley, "Maximising performance through state-of-the-art chemistry solutions," Int. Papwirtsch., No. 4, 2009, pp. 19-22, Abstract Only.

Agarwal, "Asynchronous Analog to Digital Converters: Architectures and Circuits," Dissertation, Tufts University, Aug. 2010, pp. 11-12.

Murcia, "Combining stickies monitoring and control in tissue manufacturing from recycled fiber," Tissue World Americas 2010—5th International Conference and Exhibition for the North and South American Tissue Business (2010), 9 p., Abstract Only.

Shevchenko et al., "Combining stickies monitoring and control in recycling," Tappi Press, 2010 Tappi Peers Conference and 9th Research Forum on Recycling (2010), vol. 1, pp. 809-854, Abstract Only.

Bomela et al., "Effect of machine design on performance of reluctance synchronous machine," Conference Record of the 2000 IEEE Industry Applications Conference. Thirty-Fifth IAS Annual Meeting and World Conference on Industrial Applications of Electrical Energy, Rome, Italy, 2000, vol. 1, pp. 515-522, Abstract Only.

Sithole et al., "A laboratory test to predict deposition in recycled paper making," Tappi Press, Recycling Symposium, Chicago, Apr. 14-16, 1997, pp. 367-371, Abstract Only, (HCAPLUS).

Wicklin, What is Mahalanobis distance, SAS Institute Inc, Feb. 15, 2012, 12 pgs.

Zhang, Zhenkun, et al., "Research on Tool Wear Prediction Based on LSTM and ARIMA" BDET 2018: Proceedings of the 2018 International Conference on Big Data Engineering and Technology, Date of Publication: Aug. 2018, pp. 73-77.

BTG Americas, Ludden, Daniel, "Traditional Diagnostics Meets Industry 4.0 to Drive Yankee Performance and Safety," TissueCon 2019 Conference, Oct. 2019, 19 pgs.

Goryacheva et al., "Mechanical-chemical methods for the deresinification of pulp," Bumazhnaya Promyshlennost (1976), (3), 11, Abstract Only.

Douek et al., "Some aspects of pitch control with talc in unbleached kraft pulps," Journal of Pulp and Paper Science, vol. 17, No. 5, 1991, pp. 171-177, Abstract Only.

Hyvarinen et al., "Infrared analyzers for process measurements," Proceedings of SPIE—The International Society for Optical Engineering, vol. 1762, 1992, pp. 187-192, Abstract Only.

Jagannathan, "Test and theory for robust active vibration control of rotor-bearing systems utilizing piezoelectric actuators," Dissertation, Texas A&M University, 1993, 213 pages.

Welkener et al., "The effect of furnish components on depositability of pitch and stickies," Nordic Pulp & Paper Research Journal, vol. 8, No. 1, 1993, pp. 223-225, Abstract Only.

Anon, (62nd) Pulp and Paper Research Conference, Tokyo, Japan, Jun. 1-2, 1995, Japan Tappi, 1995, 156 pages, Abstract Only.

Beck, "Stickies in recycle pulp for use in fine paper—the search for a precise method," Tappi Press, Recycling Symposium, New Orleans, Mar. 3-6, 1996, pp. 271-277, Abstract Only.

Claveau et al., "Mechanical Vibration Analysis Using An Optical Sensor," IEEE, 1996, pp. 876-879.

Sithole et al., "A laboratory test to predict deposition in recycled paper making," Tappi Press, Recycling Symposium, Chicago, Apr. 14-16, 1997, pp. 367-371, Abstract Only, (PIRA).

Zwart et al., "The struggle for paper uniformity," Tappi Press, International Engineering Conference, Miami, Sep. 13-17, 1998, vol. 1, pp. 243-251, Abstract Only.

Bomela et al., "Effect of stator chording and rotor skewing on average torque and torque ripple of reluctance synchronous machine," 1999 IEEE Africon. 5th Africon Conference in Africa, Cape Town, South Africa, 1999, vol. 2, pp. 687-690, Abstract Only.

Fugate et al., "Vibration-based damage detection using statistical process control," Mechanical Systems and Signal Processing, vol. 15, Issue 4, Jul. 2001, pp. 707-721.

(56) References Cited

OTHER PUBLICATIONS

Sohn et al., "Damage diagnosis using time series analysis of vibration signals," Smart Materials and Structures, vol. 10, 2001, pp. 446-451.

Bomela et al., "Effect of stator chording and rotor skewing on performance of reluctance synchronous machine," IEEE Transactions on Industry Applications (Jan. 2002), vol. 38, No. 1, pp. 91-100, Abstract Only.

Alessadrini et al., "Chatter Marks: Origin, Evolution and Influence of the Creping Doctors," Ind. Carta, vol. 41, No. 4, Jun. 2003, pp. 120-129.

Kosuga et al., "Reduction of Pitch Deposit Troubles by Coagulant Derived from Waste Corrugated Board," Japan Tappi Journal, vol. 58, No. 4, 2004, pp. 468-477, Abstract Only.

Zhang et al., "Statistical condition monitoring based on vibration signals," Proceedings VETOMAC-3 & ACISM-2004, pp. 1238-1243, New Delhi, India.

Holopainen et al., "Online machinery condition monitoring avoids unexpected failures and improves operator safety," Appita Journal, vol. 58, No. 1, Jan. 2005, pp. 18-21, Abstract Only, (PIRA).

Holopainen et al., "Online machinery condition monitoring avoids unexpected failures and improves operator safety," Appita Journal, vol. 58, No. 1, Jan. 2005, pp. 18-21, Abstract Only.

Rehorn et al., "State-of-the-art methods and results in tool condition monitoring: review," International Journal of Advanced Manufacturing Technologies, vol. 26, 2005, pp. 693-710.

Kermann et al., "Novel approach for the selection and optimisation of fixatives for pitch and sticky control in various fibre systems," 17th PTS CHT symposium: chemical technology of papermaking, Munich, Germany, Sep. 12-15, 2006, Paper 34, 21 pages, Abstract Only.

Kuny, "New sensors for online property measurements," Wochenbl. Papierfabr., vol. 134, No. 23-24, Dec. 2006, pp. 1415-1418.

Vahasalo et al., "White Pitch Deposition and Styrene-butadiene-rubber Binder Content in Paper Mill Process Waters," Appita Journal, vol. 59, No. 4, Jul. 2006, pp. 280-284.

Voltaire et al., "Acoustic investigation of cavitation noise from offset ink film splitting," Nordic Pulp & Paper Research Journal, vol. 21, No. 3, 2006, pp. 314-322, Abstract Only.

Voltaire et al., "Use of an on-press acoustic sensor to monitor coldset offset printing of newspaper," Nordic Pulp & Paper Research Journal, vol. 21, No. 3, 2006, pp. 323-327, Abstract Only.

Voltaire et al., "Acoustic characterisation of film splitting in a HSWO printing nip," Nordic Pulp & Paper Research Journal, vol. 22, No. 4, 2007, pp. 424-431, Abstract Only.

Voltaire et al. "Acoustic emission and tack of heat-set inks during setting on MWCpapers and fountain solution emulsification," Nordic Pulp & Paper Research Journal, vol. 22, No. 4, 2007, pp. 432-440, Abstract Only.

Akazawa et al., "Study on Regenerative Chatter Vibration in Ball End Milling of Flexible Workpieces," IEEE, 2008, 6 pages.

Arato, Jr. et al., "Automatic faults diagnosis by application of neural network system and condition-based monitoring using vibration signals," Proceedings of the 2008 IAJC-JJME International Conference, ISBM 978-1-0643-379-9.

Herbst, "Construction of paper: to survive processing," PTS Symposium 2008: paper and imaging, Munich, Germany, Oct. 15-16, 2008, 22 pages, Abstract Only.

Kerman, "Fixative selection and runnability optimization in different paper grades using the Ciba Contaminant Analyzer (CCA), " Progress 08. 16th International papermaking conference. Efficiency in papermaking and converting processes, Krakow, Poland, Sep. 23-26, 2008, 16 pages, Abstract Only.

Messaoud et al., "Detection of chatter vibration in a drilling process using multivariate control charts," Computational Statistics & Data Analysis, vol. 52, 2008, pp. 3208-3219.

Archer et al., "Chatter and Soft Tissue Production: Process Driven Mechanisms," Tissue World Americas, Feb.-Mar. 2009, pp. 33-35.

Heng et al., "Rotating machinery prognostics: State of the art, challenges and opportunities," Mechanical Systems and Signal Processing, vol. 23, 2009, pp. 724-739.

Jeong et al., "A Fault Diagnosis On Rotating Machinery Using the Mahalanobis Taguchi System," Mechanical Engineering Department, Hanyang University, Korea, Jul. 2009, 7 pages.

\* cited by examiner

| Data | Unit | Weight | Individual Score | Overall Score |
|---|---|---|---|---|
| Chemistry add-on (Adhesive and Release Aids) | Adhesive add on rate - minimum | 38% | 100.00 | 12.67 |
| Chemistry add-on (Adhesive and Release Aids) | Release add on rate | | 100.00 | 12.67 |
| Chemistry add-on (Adhesive and Release Aids) | Adhesive / Release ratio | | 100.00 | 12.67 |
| Overall vibration - Front | gRMS | 36% | 100.00 | 18.00 |
| Overall vibration - Back | gRMS | | 0.00 | 0.00 |
| Yankee Pressure | PSI | 13% | 65.70 | 8.54 |
| Uhle box vacuum | PSI | 13% | 100.00 | 13.00 |

CREPING PROCESS PERFORMANCE TRACKING AND CONTROL

CROSS REFERENCE TO RELATED APPLICATION

This application claims the benefit of U.S. Provisional Application No. 63/149,727, filed Feb. 16, 2021, the content of which is hereby incorporated by reference in its entirety.

TECHNICAL FIELD

This disclosure relates to creping and more particularly, to tracking creping performance.

BACKGROUND

In the tissue manufacturing process, a paper sheet is dried on a heated drying cylinder, termed a Yankee or Yankee dryer. Creping is the process of impacting the sheet into a hard blade (called a doctor blade or creping blade), thus compressing the sheet in the machine direction, creating a folded sheet structure. Creping breaks a large number of fiber-to-fiber bonds in the sheet, imparting the qualities of bulk, stretch, absorbency, and softness which are characteristic of tissue.

As creping doctor blades wear, they must be replaced with new ones. The process of changing blades represents a significant source of tissue machine downtime, or lost production, as creped products cannot be produced when the blade is being changed.

In normal operations, the creping doctor blade tip rides in a coating on the dryer surface and experiences minimal out of plane movement. However, if the amplitude of the out of plane movement becomes high enough, the creping doctor blade will oscillate above and below the sheet leading to the development of chatter that appears as cross directional (CD) defects. Sheet defects from chatter will appear as multiple holes in the CD or develop a lace appearance.

Under severe chatter conditions, the doctor blade will penetrate through the Yankee coating making direct contact with the dryer surface. If this occurs, potential damage to the dryer surface with the appearance of horizontal grooves on the metal surface can result. Once the dryer surface becomes damaged, it can only be repaired by taking the machine out of production and regrinding the dryer surface. Regrinding is a costly operation, because of production losses and cost of the procedure as well as degrading the dryer service lifetime due to reduction in wall thickness that negatively affects the vessel pressure rating.

Excessive vibration on the creping doctor blade, leading to chatter conditions, can originate through mechanical and operational or process conditions. Examples of mechanical vibration sources include press rolls, pumps, felts, Yankee cylinder bearings, insufficient stiffness of the doctor blade holder etc., as well as dryer roundness deformation caused by thermal non-uniformities. Once a mechanical vibration source is identified, maintenance intervention to correct the problem often requires shutting down the equipment resulting in production loss. Conversely, operational practices or process conditions that can influence vibration may include cleaning machine clothing, changing machine clothing vacuum or shower settings, changing the drying temperature, changing hood temperatures, using a steam shower, changing a transfer roll pressure, changing an edge spray, changing the doctor blade type and edge bevel, engaging a cleaning blade, changing the cleaning or creping blades, sheet moisture levels, coating chemistry, machine speed, basis weight, furnish, and loading pressure, can be attended to without interrupting production.

Regardless of the source, excess vibration experienced by the doctor blade can lead to chatter conditions affecting product quality, machine runnability, and asset value. However, the dynamics of the Yankee dryer operation can produce large variations in a sensor signal, without reaching a chatter condition. As a result, data analysis becomes more complex compared to conventional wear and failure detection.

SUMMARY

This disclosure generally describes a method of tracking data associated with a creping process. In particular, examples herein can reduce the complexity of data generated by one or more sensors in a creping process. The reduction in complexity of creping data can facilitate maintenance of various portions of a creping machine and can further facilitate efficient operation and a higher quality end product of the creping process.

One example of such a method comprises measuring process data, assigning a score to the process data, and generating an index score comprising the process data. The process data can comprise vibration data and measuring the process data can include measuring vibration of a creping blade using one or more vibration sensors. Assigning the score to the process data can then include assigning a score to the vibration data, wherein the generated index score comprises at least the assigned score of the vibration data. Further, the method can include determining an average vibration value of the creping blade wherein the average vibration value is used in assigning the score to the vibration data.

In a further example, assigning a score to the vibration data comprises comparing the vibration data to previous vibration data. The method can further comprise outputting the signal to a display. In the method, the previous vibration data can be associated with at least one previously used creping blade. The method can also include reducing the previous vibration data to a single value per creping blade and can further include comparing the standard deviation of the vibration data to a standard deviation of previous vibration data, wherein the single value is the standard deviation of the previous vibration data.

In a further example, reducing the previous vibration data to the single value per creping blade includes generating fitted vibration data by fitting a function to the vibration data. The method can also include generating a detrended function by calculating a difference between measured vibration data and the fitted vibration data and can further include calculating a standard deviation of the detrended function.

In a further example, the method includes assigning the score to the vibration data can include comparing the vibration data to a threshold. The method can also include assigning the score to the at least one vibration value using a difference between the vibration data and the threshold with a larger difference between the vibration data and the threshold corresponding to a worse score. The score can also be associated with a color with the color corresponding to the difference between the vibration data and the threshold. The generated index score can comprise the assigned score to the vibration data and at least one other score.

In a further example, the method includes weighting the score assigned to the vibration data with the score assigned to the vibration data being weighted based on operator input. The method can also include comparing the index score to a threshold and outputting a signal if the index score is above or below the threshold. Additionally, the method can include determining a length of time until a creping blade should be changed using the score assigned to the vibration data.

In a further example, the method comprises evaluating a length of time until the creping blade should be changed using the generated index score. The method can also include evaluating a performance of a Yankee dryer using the index score. The method can further include using the index score to prevent damage to the Yankee dryer. Additionally, the method can include using the index score to determine the performance of the creping process.

In a further example, the generated index score comprises measurements from one or more other sensors selected from a group consisting of a vibration sensor, a temperature sensor, a tachometer, a pressure sensor, a flow sensor, a moisture sensor and any combination thereof the method can include comparing a measurement of the one or more other sensors to a threshold and outputting a signal when the measurement is above or below the threshold.

In another example, the disclosure is directed to a system comprising a memory configured to store process data, wherein the process data includes vibration data. The system further includes one or more sensors configured to measure the process data, wherein measuring process data includes measuring vibration data of a creping blade using one or more vibration sensors. The system also includes one or more processors configured to assign a score to the process data, including assigning a vibration score for the vibration data; and generate an index score based on the score for the process data and the vibration score for the vibration data.

In another example, the disclosure is directed to a non-transitory computer-readable storage medium having stored thereon instructions that, when executed, cause one or more processors of a computing device to measure process data, wherein the process data includes vibration data, and wherein measuring process data includes measuring vibration data of a creping blade using one or more vibration sensors. The instructions further cause the one or more processors to assign a score to the process data, including assigning a vibration score for the vibration data; and generate an index score based on the score for the process data and the vibration score for the vibration data.

BRIEF DESCRIPTION OF DRAWINGS

FIG. 7 is an example index of process data including scores according to an aspect of the present disclosure.

DETAILED DESCRIPTION

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1:
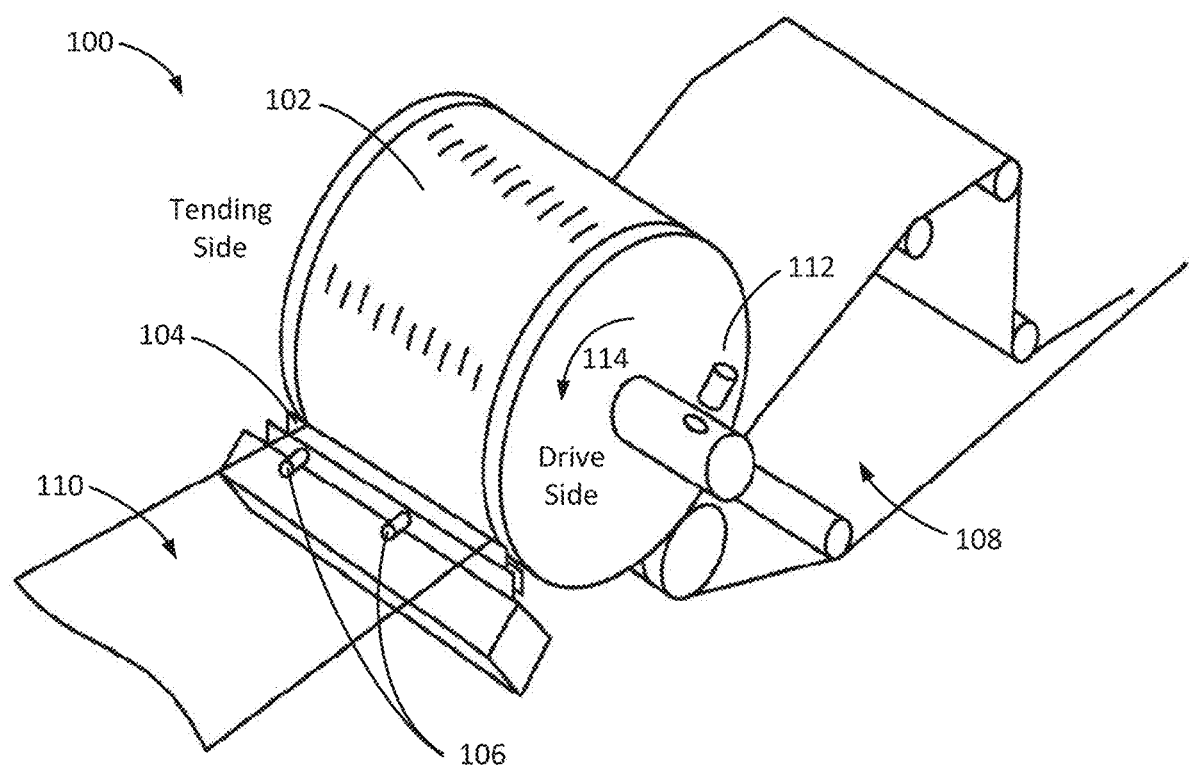
FIG. 1 is a perspective view of an example Yankee dryer with a doctor blade and vibration sensors according to an aspect of the present disclosure.

Starting with FIG. 1, FIG. 1 is a perspective view of an example assembly 100 for creping sheets of material in a paper making process. The assembly 100 includes a Yankee dryer 102, with a drive side and a tending side, a creping blade 104, vibration sensors 106, an un-creped sheet 108, a creped sheet 110, and a tachometer 112.

In operation, the un-creped sheet 108 with a first moisture content can adhere to a coating on the Yankee dryer 102. The Yankee dryer 102 can then dry the sheet to a second moisture content, lower than the first, using heat (e.g., steam heat) from the Yankee dryer 102 as the Yankee dryer rotates about its longitudinal axis. In addition to the Yankee dryer, the un-creped sheet 108 with a first moisture content can be dried by gas fired hoods that impinge hot air on the sheet surface which is not adhered to the Yankee dryer 102. Further, the Yankee dryer and the gas fired hood(s) can dry the sheet simultaneously. The sheet, having a lower moisture than the un-creped sheet, can then be removed from the Yankee dryer 102 by a creping blade 104. Creping blade 104 can ride above the surface of the Yankee dryer 102 in a coating which coats the Yankee dryer 102. For example, creping blade 104 can be pressed against the surface of the Yankee dryer 102 into a coating which is sprayed onto the Yankee dryer 102. In some examples, creping blade 104 rides along the surface of the Yankee dryer 102. Creping blade 104 can also extend along the entire width of the Yankee dryer 102, from a tending side to a drive side. Further, creping blade 104 can compress the sheet in the direction of rotation of the machine (shown by arrow 114), thereby creating a folded sheet structure of the creped sheet 110. In some examples, more than one creping blade 104 is used in the process of creping. In some examples, one or more blades can be used as a cleaning blade to remove excess coating from the surface of the Yankee dryer 102 and to prepare the dryer for additional coating application. By creping the sheet, a large number of fiber-to-fiber bonds in the sheet are broken, imparting the qualities of bulk, stretch, absorbency, and softness which are characteristic of tissue.

Various sensors can be used to monitor the process of the drying and creping of the un-creped sheet 108. In the example of FIG. 1, vibration sensors 106 are used and can be any type of sensor which can detect vibration. In some examples, vibration sensors 106 are accelerometers and in some examples, accelerometers are piezoelectric accelerometers. In operation, vibration sensors 106 can be used to measure the vibrations of creping blade 104 during a creping process. For example, vibration sensors 106 can detect differences in vibration frequencies and amplitudes of the creping blade between the tending side (e.g., front side) and the drive side (e.g., back side) of the Yankee dryer as the creping blade rides above the surface of the Yankee dryer 102 (e.g., in a coating). Differences in vibration frequencies and amplitudes can indicate that some part of the creping assembly requires maintenance. Other sensors can also be used to monitor the process of drying and creping the un-creped sheet. In FIG. 1, tachometer 112 can measure the speed at which the Yankee dryer 102 rotates (e.g., rotations per minute). In some examples pressure sensors are used which can detect things such as the Yankee steam pressure and felt uhle box pressure (e.g., vacuum). In some examples, sensors are used which measure an amount, type, and rate of coating sprayed onto the Yankee dryer 102. In some such examples, an amount and/or rate of adhesive coating sprayed onto the Yankee dryer 102 can be measured by a sensor, an amount and/or rate of release coating sprayed onto the Yankee dryer 102 can be measured by a different sensor, and a processor and/or another sensor can measure the ratio of the amount and/or rate of adhesive coating to release coating sprayed onto the Yankee dryer 102. Other sensors, such as acoustical sensors, chemical sensors, electrical sensors, moisture sensors, flow sensors, position sensors, motion sensors, speed sensors, optical sensors, and other sensors which can measure various aspects of the assembly which can crepe sheets are contemplated and a person having ordinary skill will recognize the present disclosure is not limited to the sensors listed.

Figure 2:
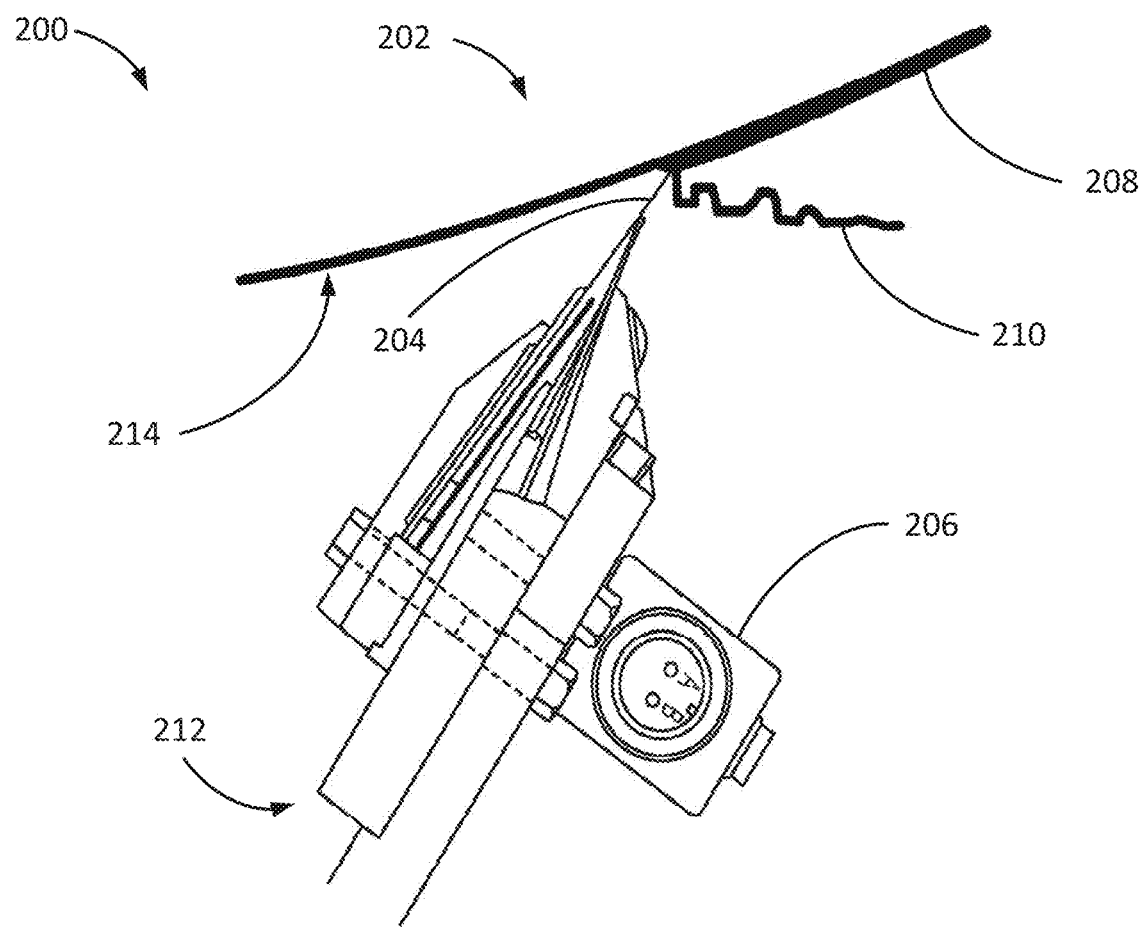
FIG. 2 is a cross-sectional view of an example doctor blade assembly performing a creping process according to an aspect of the present disclosure.

Moving to FIG. 2, FIG. 2 is a cross-sectional view of an example creping blade assembly 200 performing a creping process according to an aspect of the present disclosure. The creping blade assembly 200 includes a creping blade 204 with one or more vibration sensors 206. The creping blade 204 and one or more vibration sensors 206 are attached to a blade holder 212. The creping blade 204 can ride above the surface of a Yankee dryer 202 in a coating 214 located on the surface of the Yankee dryer 202. In some examples, the creping blade 204 can ride along the surface of a Yankee dryer 202 and in some examples, the creping blade 204 can ride above the coating 214 located on the surface of the Yankee dryer 202. FIG. 2 also includes an un-creped sheet of material 208 located on the surface of the Yankee dryer 202 and a creped sheet of material 210.

In operation, the creping blade assembly 200 performs a creping operation on the un-creped sheet of material 208. The coating 214 of the surface of the Yankee dryer 202 can cause the un-creped sheet of material 208 to adhere to the Yankee dryer 202 as the Yankee dryer 202 removes moisture from the un-creped sheet of material 208 using heat. The creping blade 204 can then be used to remove the sheet of material 208 from the surface of the Yankee dryer 202 and cause the sheet of material to fold, thereby creating a creped sheet of material 210. During this process, the creping blade 204 can vibrate against the surface of the Yankee dryer 202 which can cause various unwanted results. For example, excessive vibration of the creping blade 204 can cause holes to appear in the creped sheet of material 210, the coating 214 on the surface of the Yankee dryer to become uneven, and further can cause damage to the Yankee dryer surface itself (e.g., under the coating). In some examples, excessive vibration can be considered chattering as the creping blade 204 can chatter against the Yankee dryer 202. Measuring the vibration of the creping blade 204 can help prevent excessive vibration as when excess vibration is detected, corrective action can be taken to remedy any issues which cause the excessive vibration. Discussed further herein is a method of detecting and addressing issues such as chatter using at least vibration data. In some examples, an early warning system can detect and address excessive vibration (e.g., chatter) of the creping blade. Some such examples and methods are described in U.S. Pat. No. 9,404,895 filed Oct. 20, 2011, entitled "METHOD FOR EARLY WARNING CHATTER DETECTION AND ASSET PROTECTION MANAGEMENT" and U.S. Pat. No. 10,604,896, filed Aug. 1, 2016, entitled "METHOD FOR EARLY WARNING CHATTER DETECTION AND ASSET PROTECTION MANAGEMENT", which are assigned to the assignee of the instant application and which are herein incorporated by reference in their entirety.

Continuing with the operation of the example of FIG. 2, as creping blade 204 rides above the surface of Yankee dryer 202 in the coating 214 on the Yankee dryer 202, the creping blade 204 can become dull and require changing. In some examples, it is necessary to change the creping blade 204 before it is dull as the blade can have imperfections or other issues which can affect the creping process and the quality of the creped sheet of material 210. The time between when a creping blade is first used and when it is dull or requires changing can be considered the blade service life. Many different ways can be used to monitor when a creping blade 204 is required to be changed. In some examples, vibration sensors 206 can measure vibration data for creping blade 204 and send the vibration data to a processor. The processor can use the vibration data and compare the vibration data to a threshold, with the threshold indicative of a point at which the creping blade requires changing. In some examples, visual measurements (e.g., inspection) of the creped sheet of material 210 can be used to determine that a creping blade 204 requires changing. Further, in some examples, a processor can predict when a creping blade 204 requires changing. The processor can use different methods to predict the necessity of changing the creping blade 204 including using historical data such as previous blade service life and/or current data such as from vibration sensors 206.

Figure 3:
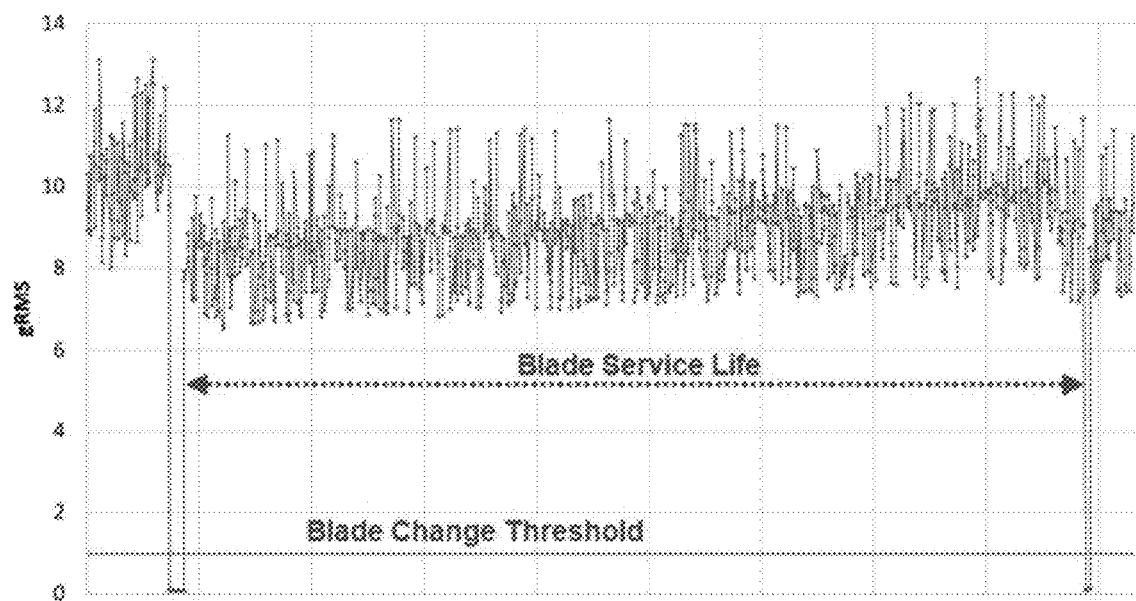
FIG. 3 is a graph of example vibration data from an accelerometer according to an aspect of the present disclosure.

Moving to FIG. 3, FIG. 3 is a graph of example vibration data taken by a vibration sensor associated with a creping blade over time. The vibration data of FIG. 3 is in the form of root mean square acceleration, or gRMS. In the present disclosure, vibration data can comprise gRMS measurements. Vibration data can be used to determine a creping blade's service life which can be further used in a variety of applications as is described further herein. The vibration data of FIG. 3 includes many different points over the life of a creping blade with a majority of points being taken while the creping blade is operating. When the creping blade is in operation, the vibration data can be higher than if the creping blade is not in operation. However, the vibration data also includes multiple points in time at which the value is at or near zero. In some examples, at such points, the creping blade is in the process of being replaced. As shown in FIG. 3, the time between points at which the vibration value is at or near zero can be considered the creping blade's service life. In some examples, a processor can receive vibration data similar to the vibration data in FIG. 3 and can determine that the time between the last value of vibration data where it is at or near zero (e.g., start point), and the first time at which the vibration data is at or near zero (e.g., stop point) corresponds with the creping blade's service life. In some other examples, the processor can receive vibration data similar to the vibration data in FIG. 3 and can determine that a creping blade is no longer in use when the vibration data moves from a higher value to a lower value (e.g., at or near zero). Further, the processor can determine that a creping blade is in use after being replaced when the vibration data moves from a lower value (e.g., at or near zero) to a higher value. The threshold at which the vibration data is considered to be at or near zero can be a creping blade change threshold. The threshold can have any value but is preferably outside an operating range of vibration data associated with a creping blade. In some examples, vibration sensors can measure vibration of the creping blade and produce vibration data continuously, while in some examples, vibration sensors can measure vibration of the creping blade and produce vibration data at discrete points in time. Using the vibration data to determine a service life of a creping blade can be advantageous over other methods as vibration data as it does not require a distributed control system (DCS) or electronic pressure transducers, both of which can be costly or unavailable to older systems.

Other ways of determining the life of a creping blade can also be used. In some examples, a sensor can measure a loading pressure of the creping blade and a processor can compare the loading pressure to a threshold to determine if the creping blade has been removed (e.g., replaced) and the time between removals. In some such examples, the sensor measuring the loading pressure can create loading data similar to the shape of vibration data of FIG. 3, and determine that if the loading pressure moves from high to low, a creping blade is being changed, while if the loading pressure moves from low to high, a creping blade is being put back into operation. In some examples, a sensor can measure the status of the creping blade loading and report a signal to a processor indicating if blade loading is enabled or disabled. In some such examples, the processor can measure a time between the disabled signals to determine the life of a creping blade. In some further examples, an operator operating the creping assembly can track the changing of creping blades in a logbook and determine the time between changes of the creping blades. Still further examples of determining the life of a creping blade are contemplated.

As illustrated in FIG. 3, vibration data can include many discrete points of data, each measured at a specific time, for a single creping blade. Vibration data can be taken at any interval, but in some examples vibration data is taken at a rate of 60 measurements per hour or one measurement per minute. In some examples, a creping blade can have a service life as short as 2 hours in operation and in some examples, a creping blade can have a service life exceeding 24 hours. It can be beneficial to track the vibration data of each creping blade used over time and perform data analysis on the total vibration data of all the blades used over a period of time. For example, tracking the vibration data of multiple creping blades and trending the data can help predict the service life of future creping blades. However, the amount of vibration data generated by many creping blades can be difficult to analyze and perform calculations on. In some examples, a large amount of processing resources and memory resources (e.g., data storage) can be required to analyze the data. It can be desirable to reduce the amount of data that has been generated by vibration sensors in order to perform useful analysis of the generated data.

Figure 4:
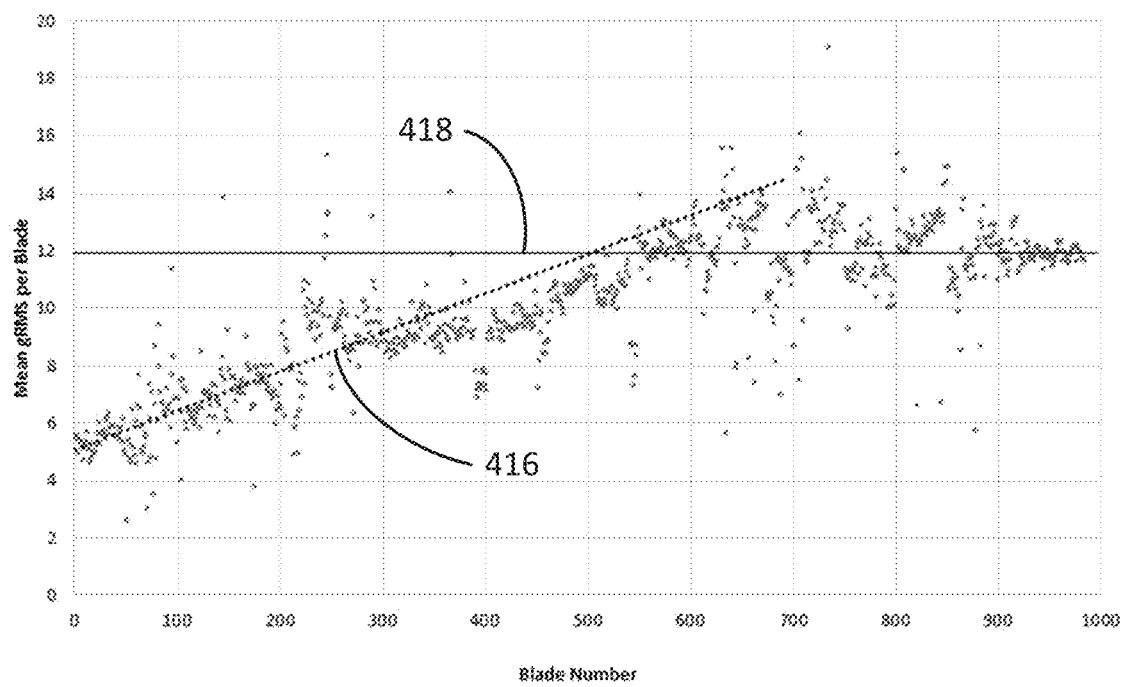
FIG. 4 is a graph of example average vibration data from multiple creping blades according to an aspect of the present disclosure.

Moving to FIG. 4, FIG. 4 is a graph of example average vibration data of a series of creping blades. In FIG. 4, the vibration data of a single creping blade (e.g., as in FIG. 3) has been reduced by taking an average of the vibration data while the creping blade was in operation. By reducing the vibration data of a single creping blade into a single data point (e.g., average), overall analysis of the data can be made with fewer processing resources and memory resources. Additionally, it can be easier for an operator or processor to draw conclusions from the data. For example, in FIG. 4, approximately 990 data points represent the average vibration data of approximately 990 creping blades. However, if the vibration data in FIG. 4 was not reduced to an average vibration value per creping blade, the number of data points would be greater than 260,000, requiring significantly more processing and memory resources.

Continuing with FIG. 4, analysis can be performed on the vibration data such as creating a trendline 416. In FIG. 4, trendline 416 uses the first approximately 200 creping blade data points and is extrapolated to approximately 700 blade data points. Trendline 416 indicates that the average vibration data is increasing over time as more creping blades are used. In some examples, an operator can use the trendline 416 to diagnose issues with the creping blades or creping assembly. For example, some issues can include excessive vibration, excessive wear, incorrect installation of creping blades, creping blade stick out, incorrect edge bevel or other issues. The trendline 416 can also be updated over time as the average vibration of each creping blade is determined. Further, an alarm and/or threshold level 418 of average vibration can be set. In some examples, an operator can use the alarm and/or threshold level 418 of average vibration to determine when a maintenance operation is required. In some examples, the alarm and/or threshold level of average vibration can be updated over time. Moreover, in some examples, the alarm and/or threshold level 418 can be used with trendline 416 to determine when a maintenance operation is required. For example, trendline 416, which is extrapolated, can cross the alarm and/or threshold level 418 of average vibration. An operator can be alerted and can take corrective action (e.g., maintenance) to prevent the average vibration of a future creping blade from being too high, which could cause damage. In some examples, the operator can use the crossing of the trendline 416 and the alarm and/or threshold level 418 to determine when maintenance or changes to the creping process are required. This can be advantageous as an operator can plan when the creping process needs to be shut down and it can also aid an operator in decision making regarding various scheduling of processes.

While in FIG. 4 the vibration data of each blade is reduced to a single average vibration value, other techniques can be used to reduce the amount of vibration data. In some examples, reducing the vibration data of each blade to a single value is done by calculating and/or determining the single value. In some examples, the single value can represent a maximum, minimum, mode, rate of change, standard deviation, detrended standard deviation, and blade service life duration. Further techniques for reducing vibration data and/or other data associated with a paper making process are contemplated, and any combination of techniques can be used to reduce the amount of data. In some examples, by reducing a series of data to a single value, a descriptive performance variable can be created. The descriptive performance variable can be a variable with a value which describes a series of values such as measurement data.

In some examples, vibration data of a creping blade is reduced to a detrended standard deviation of the vibration data. In such examples, vibration data is collected from one or more vibration sensors for a period of time such as the blade service life. A function can be fit to the vibration data and a trendline can be created. In some examples, the function is a linear function while in some examples, the function is a nonlinear function. In some examples, the trendline can be considered fitted vibration data. A difference between the fitted function and the measured vibration data can be calculated which can result in data generally centered about 0. The standard deviation of the data generally centered about 0 can be taken and the result can be considered a detrended standard deviation of the vibration data. Thus, the vibration data is reduced to the single value of a detrended standard deviation. The process of reducing the vibration data of a creping blade to a detrended standard deviation can be repeated for a series of creping blades. This can result in a single detrended standard deviation value per blade. In some examples, the process can result in a single detrended standard deviation value per a side of a blade. For example, in FIG. 5, a detrended standard deviation of a front side of a creping blade and a back side of the creping blade can be determined. This can be advantageous over using a single detrended standard deviation of the entire creping blade as it can be more accurate.

Figure 5:
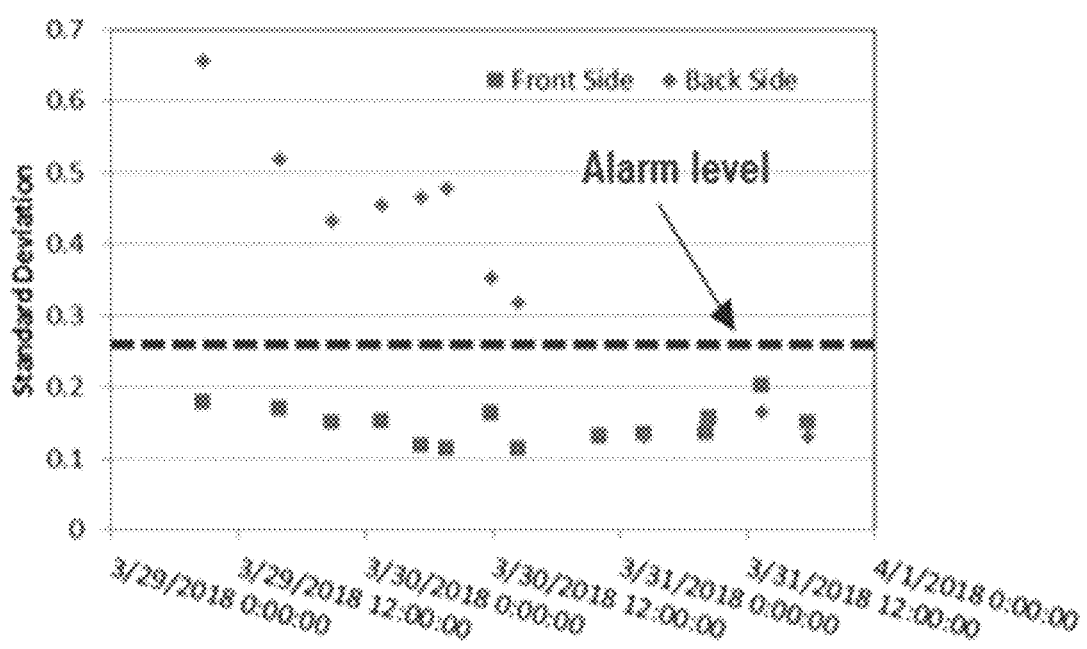
FIG. 5 is a graph of an example detrended standard deviation of vibration data from multiple creping blades including an alarm level according to an aspect of the present disclosure.

Continuing with the example of FIG. 5, the detrended standard deviation values for the front and back of multiple creping blades over the life of the creping blades can be charted. Further, in some examples, an alarm level can be set which can cause an alarm to be set off and/or cause a signal to be output when a detrended standard deviation value exceeds a threshold. In some examples, the alarm and/or the signal can be output to a display such that an operator can be notified. Compared to a traditional alarm, which could indicate when current vibration data exceeds a threshold, the alarm level for the detrended standard deviation data can indicate at a higher level that something is wrong. For example, a traditional alarm can indicate that a creping blade is an issue due to high vibration measurements while an alarm level can indicate that a creping blade is not the issue, but rather another part of the creping process is wrong as a new creping blade still caused the detrended standard deviation of the vibration data to exceed the alarm level. In the example of FIG. 5, each data point represents the detrended standard deviation of the vibration data associated with the front or back of a single creping blade. While the front side data is below an alarm level for all the creping blades, the back side data is above the alarm level for multiple creping blades until a point at which it is below the alarm level. This can indicate that something other than changing the creping blade was used to correct the creping process. In some examples, the alarm level can be used for secondary alarming. In some such examples, the secondary alarming can have a higher sensitivity to the operating state of the creping process and can be used to capture any defects in the process early and with a higher frequency than traditional alarming on vibration data itself.

While vibration data from vibration sensors has been described, in some examples, vibration data comprises vibration frequency. In some such examples, vibration data can be collected at various vibration frequencies. The vibration data can be separated into frequency bands with each frequency band representing possible issues with the creping process which can be diagnosed by an operator. For example, vibration data which is in the frequency band of 0 to 5 kilohertz can indicate that the creping blade holder has an issue and/or the Yankee dryer is out of round. Further, vibration data which is in the frequency band of 15 to 20 kilohertz can indicate that no major issues are present and that the creping process is operating in an acceptable condition. In some examples, the vibration frequency data from creping blades can be reduced. In some examples, the vibration frequency data from creping blades can be reduced on a per blade basis in a similar manner as vibration data is reduced to a single value as described elsewhere herein.

While reducing vibration data of a creping blade to a single value is discussed, reducing data from other sensors, machines, and assemblies is also contemplated and a person having ordinary skill will understand that this disclosure is not limited to the examples of reducing variables provided. For example, reducing vibration data associated with a cleaning blade is also contemplated.

As previously discussed herein, various sensors can be used to measure various parts of the creping assembly in the creping process. Sensors can include tachometers, pressure sensors, temperature sensors, moisture sensors, flow sensors, Yankee coating film thickness sensors, Yankee coating film modulus sensors, and other sensors with each sensor capable of providing data of the operation of the creping assembly to a processor. Some examples of such sensors are described in U.S. Pat. Nos. 8,691,323 and 9,388,530, both of which are hereby incorporated by reference in their entirety. The amount of data generated by the sensors can be large and complex as many different sensors can be used in various parts of the creping process and/or for a single part of the creping process. To reduce the amount and complexity of the data, a score can be assigned to the data generated from a sensor. Further, in some examples, a score can be used to determine how various parts of the creping process are performing. The assigning of a score to the data generated from a sensor (e.g., process data) can be done in a variety of ways and can further be based on a variety of factors. In some examples, the assigning of a score to the data generated from a sensor can be based on previous sensor data, statistical manipulation of the sensor data such as an average and/or standard deviation, and/or any combination of factors.

In some examples, a score can be assigned to the data generated from multiple sensors. In some examples, a score can be generated from the data generated from multiple sensors. The score can have a range of values. In some examples, the score can have a range between 0 and 100 with 100 representing an ideal score and 0 representing the least ideal (e.g., worst) score. For example, a pressure sensor can measure the steam pressure of the Yankee dryer in pounds per square inch (PSI) and a first measurement in PSI can be assigned a first score and a second measurement in PSI can be assigned a second score. In such an example, the second score can be closer to the ideal score of 100 than the first score and an operator can more easily interpret that the second measurement is better than the first measurement. By assigning the actual measurement with a score, knowledge of an ideal measurement (e.g., in PSI) is not needed and comparing a measurement to a threshold can be done more quickly. In some examples, each score can correlate directly with the value of the sensor measurement, however in some examples, each score is not directly correlated with the value of the sensor measurement. In some examples, the difference between a first value and a second value can be the same difference as between a first score and a second score, but in some examples, the difference is not the same. In some examples, the assigned score can indicate that the measurement data is outside of an acceptable range.

Figure 6A:
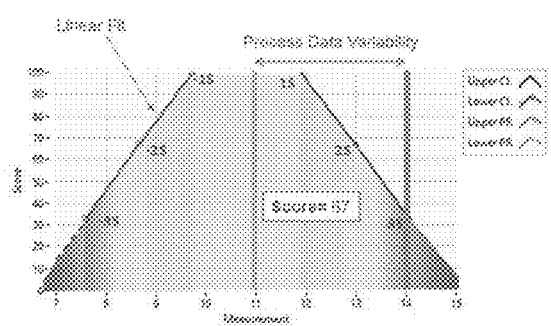
FIG. 6A is an example graph for scoring process data according to an aspect of the present disclosure.

While a single measurement value from a sensor can be assigned a single score, in the example of FIG. 6A, a single score is assigned to a series of measurement values (e.g., process data). Process data can include data from a creping machine and/or data from product produced by the creping machine (e.g., creped paper). For example, process data can include vibration data of a creping blade, Yankee steam pressure, and quality data of creped paper. In some examples, process data is associated with a machine such as a creping machine and the process data can be considered machine process data. The machine process data is process data that is associated with a corresponding machine. In some examples, the process data can be recorded such as in non-volatile computer-readable memory. In some examples, the recorded process data can be used by one or more processors (e.g., to generate indices) as is described elsewhere herein.

Assigning a score to a series of measurement values can reduce the amount and complexity of the measurement values. For example, FIG. 6A includes process data, which can include any sensor measurement values over time, is assigned a single score of 67. In order to obtain the single score, an average of the process data is determined along with a standard deviation of the process data. The standard deviation of the process data is added to the average to generate an upper value while the standard deviation of the process data is subtracted from the average to generate a lower value. The range between the upper and lower values of the process data can represent the variability of the process data. The upper and lower values are used with control lines (CL) in that the scores at which the upper and lower values intersect with the control lines represent the scores assigned to the upper and lower process data values. In the example of FIG. 6A, the average of the process data is 12.5 while the standard deviation is 1.5. Thus, the standard deviation added to the average is 14 (e.g., upper value) and the standard deviation subtracted from the average is 11 (e.g., lower value). The intersect of the upper value with the control lines is approximately 35 and thus the score assigned to the upper value is 35. The intersect of the lower value with the control lines is approximately 100 and thus the score assigned to the lower value is 100.

As can be seen in FIG. 6A, multiple process data values can correspond to the same score as control lines are on either side of a central value. The central value can be an ideal average value of the process data. The control lines on either side of the central value can be determined by using multiples of a standard deviation of ideal process data. For example, in FIG. 6A, the central value of the process data is approximately 10.8 while a standard deviation of ideal process data is approximately 1. The standard deviation is then added to the central value once to determine the 1S point of the upper control line, twice to determine the 2S point of the upper control line, and a third time to determine the 3S point of the upper control line. A liner fit between the points can be determined and thus the upper control line is determined. To determine the lower control line, the standard deviation is subtracted from the central value once to determine the −1S point, twice to determine the −2S point, and a third time to determine the −3S point of the lower control line. A linear fit between the points can be determined and thus the lower control line is determined.

Continuing with FIG. 6A, once the upper and lower values of the process data are assigned, an overall score can be assigned to the process data. To determine the overall score of the process data, the upper score and the lower score are averaged. The overall assigned score to the process data, which includes measurement values from a sensor over time, can thus be written as the function:

$$Score_{Overall} = \frac{Score(PR_\mu + \sigma) + Score(PR_\mu - \sigma)}{2}$$

where $Score_{Overall}$ is the overall assigned score, $PR\mu$ is the average of the process data, and $\sigma$ is the standard deviation of the process data, and $Score(x)$ means the assigned score as a function of x. In FIG. 6A, the overall score of 67 is determined by taking the average of the upper score, 35, and the lower score, 100, assigned to the standard deviation added to the average process data, 14, and the standard deviation subtracted from the average process data, 11, respectively.

The process of assigning an overall score to a series of values, such as the process data variability, can be advantageous over assigning a score to each individual process data value as a single value may not be representative of the actual condition of a measured device. The process of assigning an overall score, in contrast, can account for the variability of the measured data relative to a centerline. The process can be further advantageous over taking a simple average of the process data as a simple average cannot take into account the variability of the process data.

In the example of FIG. 6A, a higher overall score of the process data (e.g., closer to 100) can indicate that the process data, the sensor measurement, and the assembly the sensor is measuring are in a better condition than compared to a lower score. In some examples, colors can be associated with ranges of assigned scores and in some examples, red is associated with an overall score range between 0 and 33, yellow is associated with an overall score range between 34 and 66, and green is associated with an overall score range between 67 and 100. Other ranges and colors are contemplated. In some examples, a lower score corresponds with worse operating conditions (e.g., excessive vibration).

Figure 6B:
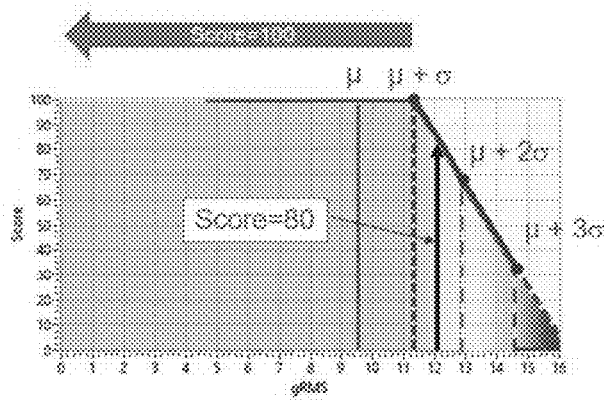
FIG. 6B is an alternative example graph from scoring process data according to an aspect of the present disclosure.

In some examples, process data, such as vibration data, can have an ideal range where one end of the range is not limited. In some such examples, only adding or only subtracting one or more standard deviations from the average are of interest. For example, in FIG. 6B, while vibration data higher than the average vibration data plus one standard deviation of the vibration data is associated with an overall score less than 100, all vibration data below the average plus one standard deviation has a score of 100. In FIG. 6B, this is because a lower value of vibration data is classified as a good operating state. In such examples, only one of the standard deviations of the process data added to the average of the process data or the standard deviation of the process data subtracted from the average of the process data is of concern. Further, only one control line can be used to assign a score to such process data. For example, in FIG. 6B, the standard deviation of the vibration data added to the average of the vibration data is approximately 12, which intersects the control line at a score of approximately 80. If more than one process data value is used in assigning a score to the process data, then the overall score can use the method for an overall score as previously disclosed herein.

In some examples, the process of assigning a score to process data can be repeated in order to assign scores to process data from multiple sensors. Further, in some examples, an index can be generated which comprises the multiple scores assigned to the process data from multiple sensors. A processor, operator, non-computer readable storage medium having instructions stored thereon, and/or other computing devices can be used to generate the index. In some examples, process data from one sensor can be given an individual score while in some examples, process data from multiple sensors can be given an individual score.

In the example of FIG. 7, process data from multiple sensors are combined into an index. The index can comprise a name of the process data which represents the type of process data. The index can further comprise a unit of measurement associated with the process data. The index can also comprise of a color associated with each of the individual scores as previously discussed herein. For example, the index of FIG. 7 comprises process data representative of the Yankee pressure (e.g., Yankee dryer pressure) which has a unit of PSI and an individual score of 65.70 which correlates with a yellow color indicator. Further, the index of FIG. 7 comprises process data representative of the uhle box vacuum which has a unit of PSI and an individual score of 100.00 which correlates with a green color indicator.

The index can comprise scores associated with any sensors on a creping machine and the index can be customized such that scores associated with any sensor can be added or removed at any time. In some examples, though, the index can comprise scores associated with sensors and/or tests performed on the product produced by the creping machine in addition to or in lieu of scores associated with sensors on the creping machine. One such example of an index is a Yankee protection index. The Yankee protection index is named as such because the types of process data incorporated into the Yankee protection index can have an effect on the surface of the Yankee dryer. In the example, the sources of the process data include back side gRMS vibration data, front side gRMS vibration data, Yankee steam pressure data, felt uhle box pressure (e.g., vacuum) data, adhesive coating add-on data, release coating add-on data, and data of the ratio of adhesive coating vs. the release coating. Other sources of process data can be incorporated into the Yankee protection index and the sources of process data is not limited to those listed. Additionally, in some examples not all the sources of process data listed are included in the Yankee protection index.

Another example of an index is a blade performance index which has sources of process data including blade life (e.g., determined by vibration data as described elsewhere herein), vibration data, blade loading pressure, and edge wear rate. The blade performance index can be associated with the performance of the creping blade or other blades such as a doctor blade. In some examples, a creping efficiency index can be an index of process data which is associated with how efficiently a Yankee coating is producing desired end quality properties in the finished product (e.g., tissue sheet). The creping efficiency index can include process data from various sources including a stretch to crepe ratio, which is defined by the machine direction (MD) stretch in the finished sheet divided by the crepe ratio with the crepe ratio defined by a reel speed subtracted from a Yankee speed, with the difference being divided by the reel speed. The creping efficiency index can also include process data from sources such as an amount of Yankee adhesive coating, an amount of Yankee release coating, a ratio of the Yankee adhesive coating to the Yankee release coating, a crepe count in the sheet (e.g., crepe structures per inch), and vibration data. Another example of an index can be a product quality index which is associated with the quality of the final product produced by the creping process (e.g., tissue quality). The product quality index can comprise sources of process data which include sheet moisture data, sheet softness, sheet bulk, sheet stretch in both the MD and the cross direction (CD), and sheet moisture after the Yankee dryer (e.g., creping moisture). In some examples, the various sources of process data used in the product quality index are associated with the finished product of the creping process (e.g., final creped sheet). In some examples, the process data associated with the product quality is considered product quality data. A person of ordinary skill will appreciate other indices are contemplated such as a felt health index, an energy usage index, and a wet end performance index. Such indices can include process data from various sources such as sensors and the process data included in each index can be changed at any time.

In some examples, the index comprises at least a score associated with vibration data. In some examples, the index includes scores from disparate sources which do not influence each other (e.g., two different creping machines). In some examples, the index includes scores from sources which do influence each other. In some examples, the index includes scores from sources which have a correlation with each other. For example, in FIG. 7, the score of the overall vibration of the front of a creping blade and the score of the overall vibration of the back of the creping blade can be correlated with each other and included in the index. By including scores from sources which can be correlated with each other, an index can be made which includes the most relevant factors to a specific process within the overall creping process. This can be advantageous as the scores from different sources can be grouped and can be more easily understood by operators than if the scores from different sources were ungrouped. The index can also reduce the time necessary to troubleshoot aspects of the creping process as scores from sources correlated with each other can indicate which aspect(s) of the creping process require corrective action.

In some examples, different indices can reflect changes in each other and in some examples, can interact with one another. For example, a poor blade performance index can indicate a risk for the Yankee protection index. In such an example, the Yankee protection index can decrease if the blade performance index decreases. In some examples, the performance of one index can be indicative of the performance of another index and each of the indices can include and give weight to the performance of the other index.

In some examples, an overall score can be assigned to an index. The overall score can include the scores from the difference sources within the index. In some examples, the overall score can be a simple sum of the individual scores. In some examples, the overall score can be a weighted sum of the individual scores. In the example of FIG. 7, an overall score of 77.54 is calculated from a weighted sum of the individual scores assigned to the various sources of process data. The individual scores can be weighted in any way and can be modified at any time. In some examples, the weight of some individual scores is higher than other weights of individual scores. In some such examples, the weight of an individual score can be based on the relative importance that the individual score has to the overall index. In some other examples, the weight of an individual score can be user-defined and/or based on the variable sensitivity of the individual score. For example, in FIG. 7, the score associated with the overall vibration of the front of a creping blade has a weight of 36% while the score associated with the Yankee pressure has a weight of 13%. Thus, the overall score of the index will reflect this weighting and the overall score of the index will depend more on the overall vibration of the front of the creping blade than the Yankee pressure. In the example of FIG. 7, the overall vibration of the front of the creping blade is more important to the creping process than the Yankee pressure and so the weight of the overall vibration of the front of the creping blade is higher than the weight of the Yankee pressure measurement.

In FIG. 7, an overall score for each individual score is determined by multiplying the individual score with the weight given to the individual score. The overall score for each individual score can be added together to generate an overall score of the index. In some examples, the overall score for an index can be considered an index score. For example, in FIG. 7, the overall index score of 77.54 is a sum of: various chemistry add-on process data scores multiplied by a weight of 38% (e.g., 0.38), overall vibration of the front and back of a creping process data scores multiplied by a weight of 36% (e.g., 0.36), and Yankee pressure and uhle box vacuum process data scores multiplied by a weight of 13% (e.g., 0.13). In some examples, the index score comprises at least a score of vibration data, with the vibration data associated with one or more vibration sensors sensing the vibration of a creping blade. Using a weighted index score can be advantageous because it can provide an easy to understand overall indication of the performance of a process involving multiple sensors. In some examples, the index score can include colors to help quickly understand how well the overall process, which includes multiple sources of data, is performing. For example, in FIG. 7, the score of 77.54 is green indicating acceptable performance (e.g., score of 67-100) while a score of 34 to 66 could be yellow indicating a possible issue and a score of 0 to 33 could be red indicating a possible failure.

In some examples, the individual scores of the process data can be compared to a threshold, while in some examples, the index score can be compared to a threshold. A threshold can be a single value, a series of values, and/or a range of values. The threshold can be defined at any time and can change at any time, however, in some examples, the threshold is a user-defined value which remains constant over time. In some examples, when a value passes the threshold value, a signal is output and/or an alarm is triggered. In some examples, the value only has to be the same as the threshold value for a signal to be output and/or an alarm to be triggered. The signal and/or alarm can be output on a display such that an operator can be notified that the value has exceeded the threshold value. The alarm can indicate in any manner that the value has passed the threshold value. For example, the alarm can be a visual alarm, an audible alarm, or a combination thereof. In some examples, the alarm is displayed on a display. In the example of FIG. 7, an alarm can be triggered if any one of the scores passes a threshold score (e.g., 34) and additionally or alternatively, an alarm can be triggered if the index score passes a threshold score. It can be advantageous to alarm on the index score rather than to alarm on an individual score because the index score can allow an operator to determine which system of the creping assembly requires attention rather than which individual sensor requires attention. In some examples, alarming on the index score allows an operator to isolate an issue to a specific system of the creping assembly. Additionally, in some examples, individual scores of process data can have larger changes within a period of time, alarming more frequently than an index score. In some such examples, the individual score alarms do not affect the overall creping process and alarming on the individual scores would be unnecessarily frequent. Thus, alarming on the overall score rather than on individual scores can be a better indication that corrective action needs to be taken. The index score can also be compared to other index scores such as historical index scores, index scores from other creping assemblies, and ideal index scores. Further, an index score can be trended over time to determine how the index of various measurement sources changes overtime. This can provide insight as to when maintenance or other corrective actions should be scheduled.

While an index score corresponding with a creping process and/or creping assembly has been described, in some examples, an index score can be used with assemblies, machines, and/or other processes. Further, in some examples, multiple index scores can be combined to form an overall index with an overall index score. For example, a papermaking assembly can include a creping assembly with an index and index score as well as other assemblies and/or machines with other indices and index scores. The different indices and index scores can be combined together in any way to form a single, overall index with an overall index score representative of the entire papermaking assembly. This can be advantageous as the overall index and index score can allow an operator to monitor an entire papermaking assembly easily due to the reduction of process data. Additionally, in some examples, the overall index score can be easily compared to overall index scores from other machines and/or assemblies, to averages of other overall index scores, and/or to a standardized overall score.

Figure 8:
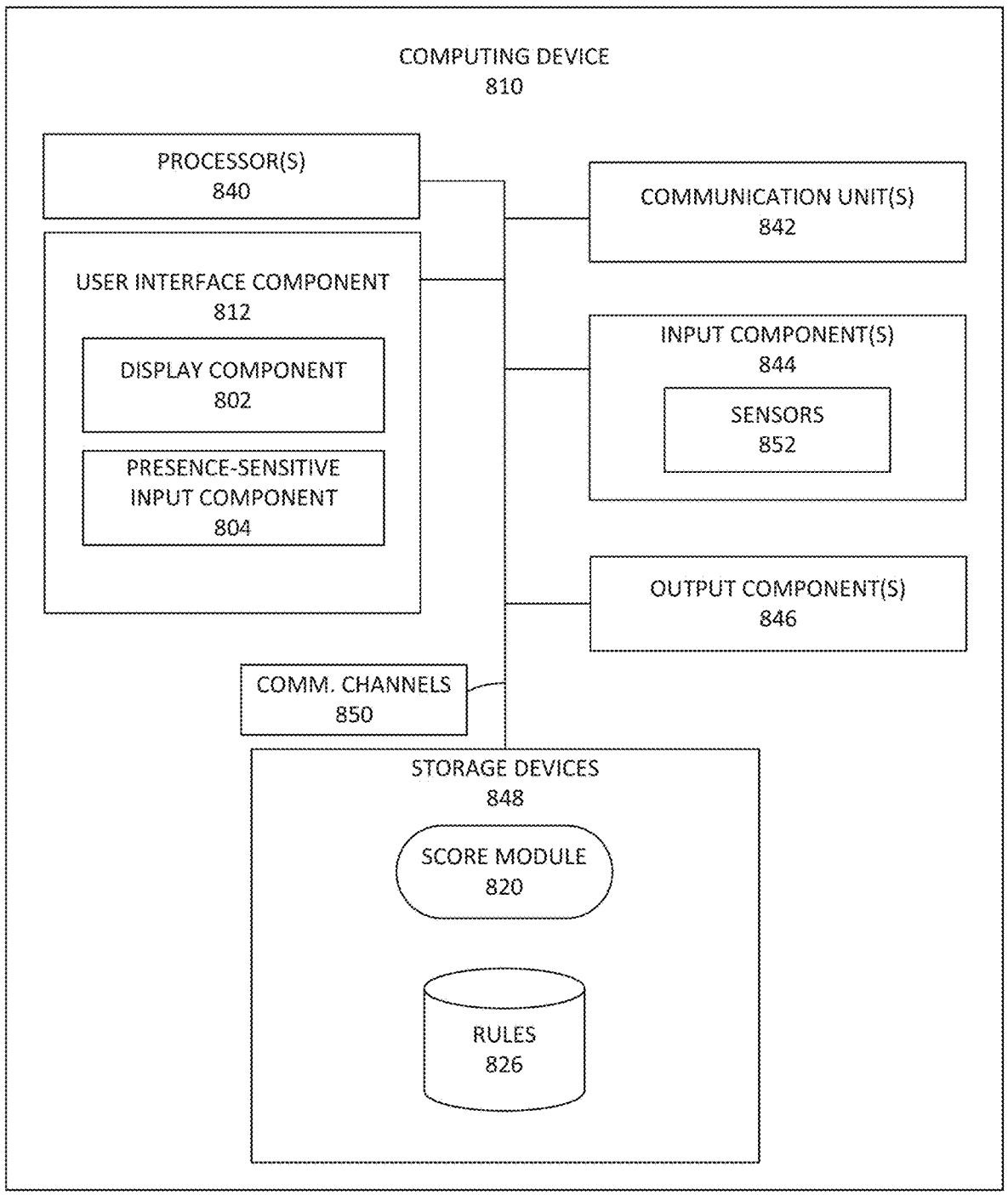
FIG. 8 is a block diagram illustrating an example computing device configured to determine a characteristic of received user input and output a corresponding set of sub-elements associated with an application on the computing device, in accordance with one or more aspects of the techniques described in this disclosure.

FIG. 8 is a block diagram illustrating an example computing device configured to determine a characteristic of received user input and output a corresponding set of sub-elements associated with an application on the computing device, in accordance with one or more aspects of the techniques described in this disclosure. Computing device 810 of FIG. 8 is described below. FIG. 8 illustrates only one particular example of computing device 810, and many other examples of computing device 810 may be used in other instances and may include a subset of the components included in example computing device 810 or may include additional components not shown in FIG. 8.

As shown in the example of FIG. 8, computing device 810 includes user interface device (UID) 812, one or more processors 840, one or more communication units 842, one or more input components 844, one or more output components 846, and one or more storage components 848. UID 812 includes display component 802 and presence-sensitive input component 804. Storage components 848 of computing device 810 include score module 820, and rules data store 826.

One or more processors 840 may implement functionality and/or execute instructions associated with computing device 810 to generate an index score for a creping blade.

Examples of processors 840 include application processors, display controllers, auxiliary processors, one or more sensor hubs, and any other hardware configure to function as a processor, a processing unit, or a processing device. Module 820 may be operable by processors 840 to perform various actions, operations, or functions of computing device 810. For example, processors 840 of computing device 810 may retrieve and execute instructions stored by storage components 848 that cause processors 840 to perform the operations described with respect to module 820. The instructions, when executed by processors 840, may cause computing device 810 to generate an index score for a creping blade. Score module 820 may perform operations for generating an index score based on received data points from sensors 852.

One or more storage components 848 within computing device 810 may store information for processing during operation of computing device 810 (e.g., computing device 810 may store data accessed by module 820 during execution at computing device 810). In some examples, storage component 848 is a temporary memory, meaning that a primary purpose of storage component 848 is not long-term storage. Storage components 848 on computing device 810 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 848, in some examples, also include one or more computer-readable storage media. Storage components 848 in some examples include one or more non-transitory computer-readable storage mediums. Storage components 848 may be configured to store larger amounts of information than typically stored by volatile memory. Storage components 848 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 848 may store program instructions and/or information (e.g., data) associated with module 820 and rules data store 826. Storage components 848 may include a memory configured to store data or other information associated with module 820 and rules data store 826.

Communication channels 850 may interconnect each of the components 812, 840, 842, 844, 846, and 848 for inter-component communications (physically, communicatively, and/or operatively). In some examples, communication channels 850 may include a system bus, a network connection, an inter-process communication data structure, or any other method for communicating data.

One or more communication units 842 of computing device 810 may communicate with external devices via one or more wired and/or wireless networks by transmitting and/or receiving network signals on one or more networks. Examples of communication units 842 include a network interface card (e.g., such as an Ethernet card), an optical transceiver, a radio frequency transceiver, a GPS receiver, or any other type of device that can send and/or receive information. Other examples of communication units 842 may include short wave radios, cellular data radios, wireless network radios, as well as universal serial bus (USB) controllers.

One or more input components 844 of computing device 810 may receive input. Examples of input are tactile, audio, and video input. Input components 844 of computing device 810, in one example, includes a presence-sensitive input device (e.g., a touch sensitive screen, a PSD), mouse, keyboard, voice responsive system, camera, microphone or any other type of device for detecting input from a human or machine. In some examples, input components 844 may include one or more sensor components 852 one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). In some examples, the one or more sensor components 852 can be vibration sensors which can detect vibration and/or acceleration of one or more creping blades. In some examples, the one or more sensor components 852 can be tachometers for measuring rotational speed of components (e.g., Yankee dryer), pressure sensors for measuring steam pressure of the Yankee dryer, chemical sensors which can measure an amount and/or rate of adhesive coating spayed onto the Yankee dryer, and/or moisture sensors which can measure the moisture content of a sheet through various steps of the creping process. Other sensors, to name a few other non-limiting examples, can include acoustical sensors, chemical sensors, electrical sensors, flow sensors, position sensors, motion sensors, speed sensors, and optical sensors.

One or more output components 846 of computing device 810 may generate output in a selected modality. Examples of modalities may include a tactile notification, audible notification, visual notification, machine generated voice notification, or other modalities. Output components 846 of computing device 810, in one example, includes a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality.

UID 812 of computing device 810 may include display component 802 and presence-sensitive input component 804. Display component 802 may be a screen, such as any of the displays or systems described with respect to output components 846, at which information (e.g., a visual indication) is displayed by UID 812 while presence-sensitive input component 804 may detect an object at and/or near display component 802.

While illustrated as an internal component of computing device 810, UID 812 may also represent an external component that shares a data path with computing device 810 for transmitting and/or receiving input and output. For instance, in one example, UID 812 represents a built-in component of computing device 810 located within and physically connected to the external packaging of computing device 810 (e.g., a screen on a mobile phone). In another example, UID 812 represents an external component of computing device 810 located outside and physically separated from the packaging or housing of computing device 810 (e.g., a monitor, a projector, etc. that shares a wired and/or wireless data path with computing device 810).

UID 812 of computing device 810 may detect two-dimensional and/or three-dimensional gestures as input from a user of computing device 810. For instance, a sensor of UID 812 may detect a user's movement (e.g., moving a hand, an arm, a pen, a stylus, a tactile object, etc.) within a threshold distance of the sensor of UID 812. UID 812 may determine a two or three-dimensional vector representation of the movement and correlate the vector representation to a gesture input (e.g., a hand-wave, a pinch, a clap, a pen stroke, etc.) that has multiple dimensions. In other words, UID 812 can detect a multi-dimension gesture without requiring the user to gesture at or near a screen or surface at which UID 812 outputs information for display. Instead, UID 812 can detect a multi-dimensional gesture performed at or near a sensor which may or may not be located near the screen or surface at which UID 812 outputs information for display.

In accordance with the techniques described herein, the one or more sensors 852 can measure process data which can be electronically transmitted to the score module 820 of the computing device 810. The score module 820 can assign a score to the process data and can further generate an index score comprising the process data. In some examples, the process data comprises product quality data with the product quality data associated with a finished product of the creping process. However, in some examples, the process data comprises vibration data and the one or more sensors 852 are vibration sensors which measure vibration data of a creping blade. In such examples, the score module 820 can assign a score to the vibration data with the index score comprising at least the assigned score of the vibration data. In some examples, the one or more processors 840 can determine an average vibration value of a creping blade and the score module 820 can assign a score to the vibration data using the average vibration value. In some examples, the one or more processors 840 calculate a standard deviation of vibration data of the creping blade and the score module 820 assigns a score to the vibration data using the standard deviation of the vibration data. In some such examples, the standard deviation is compared to a threshold and if the standard deviation exceeds the threshold, the computing device can output a signal indicating as such. In further examples, the signal is output to a display.

In some examples, the scoring module 820 can compare the vibration data to previous vibration data and assign a score to the vibration data based on the comparison. Further, in some examples, the previous vibration data can be associated with at least one previously used creping blade with the previous vibration data, in some examples, being reduced to a single value per creping blade. In some such examples, the one or more processors 840 can compare the standard deviation of the vibration data to a standard deviation of previous vibration data with the single with the single value being the standard deviation of the previous vibration data. In some examples, one or more processors 840 determine the single value by generating fitted vibration data by fitting a function to the vibration data, generating a detrended function by calculating a difference between the measured vibration data and the fitted vibration data, and calculating a standard deviation of the detrended function. In some examples, the one or more processors 840 determine a start point and a stop point of the at least one previously used creping blade where the start point corresponds to a start of use of the at least one previously used creping blade and the stop point corresponds to an end of use of the at least one previously used creping blade.

In some examples, the vibration data comprises vibration data at one or more frequencies. In some such examples, the computing device 810 can diagnose one or more issues with a Yankee dryer based at least in part on the vibration data. Issues of a Yankee dryer can include excess vibration of creping blades, scratching of the Yankee dryer surface, coating deficiencies, steam pressure variations, and other incorrect operations of portions of the Yankee dryer system. In some examples, the score module 820 can assign a score to the least one vibration value by comparing the vibration data to a threshold. In some such examples, the score module 820 assigns the score to the at least one vibration value using a difference between the vibration data and the threshold. In further examples, a larger difference between the vibration data and the threshold correspond to a worse score. In some examples, the score module 820 associates a color with the score of the vibration data which can correspond to the difference between the vibration data and the threshold.

In some examples, the index score comprises the score assigned to the vibration data (e.g., by score module 820) and at least one other score, which can be associated with a paper making process. In some such examples, the score module 820 associates and can assign the at least one other score with creping blade chatter. However, in some examples, the score module 820 assigns a score to data from sensors such as: vibration of a back side of a creping blade, vibration of a front side of a creping blade, a steam pressure of a Yankee dryer, a uhle box pressure (e.g., vacuum) of the felt, properties of an adhesive coating on a Yankee dryer, properties of a release coating on a Yankee dryer, a ratio of the properties of the adhesive coating and the release coating, and any combinations thereof. In some examples, the one or more processors 840 in conjunction with the score module 820 weight any assigned scores (e.g., a score assigned to vibration data) and sum them together provide an index score. In some such examples, an operator can input the weighting into the computing device 810. In some examples, the one or more processors 840 in conjunction with the score module 820 can compare the index score to a threshold and output a signal if the index score is above or below the threshold.

In some examples, the one or more processors 840 can determine a length of time until a creping blade should be changed using the score assigned to the vibration data by the score module 820, and/or by using the index score. In some examples, the one or more processors 840 evaluates a performance of a Yankee dryer using the index score. In some examples, the index score is used to prevent damage to the Yankee dryer and/or to determine the performance of the creping process. Further, in some examples, the index score comprises measurements from one or more other sensors which can be selected from a group consisting of a vibration sensor, a temperature sensor, a tachometer, a pressure sensor, a flow sensors, a moisture sensor, and any combination thereof.

In some examples, the sensors 852 are vibration sensors which can be located on the front side of a creping blade and/or on a back side of a creping blade. In some examples, the creping blade is a doctor blade while in some examples, the creping blade is a cleaning doctor blade.

In some examples, the index score is associated with a first paper making machine and is compared to a second index score by the one or more processors 840 with the second index score associated with a second paper making machine. In some examples, the one or more processors 840 and/or the score module compare the index score to a value with the value being an average index score of one or more paper making machines. In some examples, one or more vibration sensors generate the vibration data which comprises a series of side-to-side variation measurements over time for the creping blade during a papermaking process.

Figure 9:
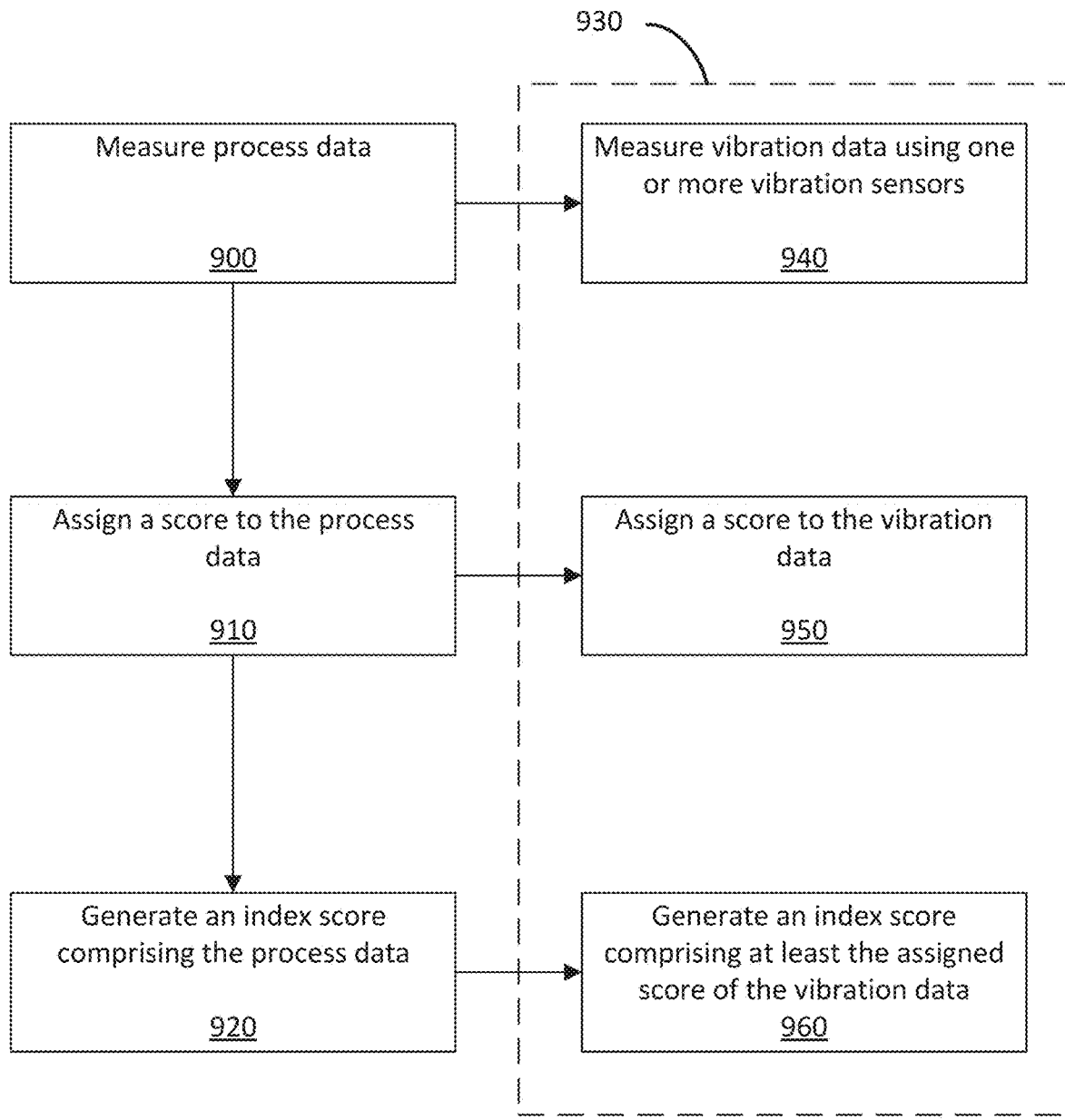
FIG. 9 is a flow chart illustrating an example mode of operation of a processor performing the creping process performance tracking and control according to an aspect of the present disclosure.

FIG. 9 is a flow chart illustrating an example mode of operation. The techniques of FIG. 9 may be performed by one or more processors of a computing device, such as computing device 810 illustrated in FIG. 8. For purposes of illustration only, the techniques of FIG. 9 are described within the context of computing device 810 of FIG. 8, although computing devices having configurations different than that of computing device 810 may perform the techniques of FIG. 9.

In the example method of FIG. 9, at 900, the one or more sensors 852 measure process data. At 910, the score module 820, alone or in combination with the one or more processors 840 assign a score to the process data. At 920, the score module 820, alone or in combination with the one or more processors 840 generates an index score comprising the process data. Element 930 illustrates one example of the method outlined in steps 900, 910, and 920. In the example, measuring process data 900 comprises measuring vibration data using one or more vibration sensors 940. Further, assigning a score to the process data 910 comprises assigning a score to the vibration data 950. Additionally, in the example 930, generating an index score comprising the process data 920 comprises generating an index score comprising at least the assigned score of the vibration data 960.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of tracking data associated with a creping process, the method comprising:
    measuring process data, wherein the process data includes vibration data, and wherein measuring process data includes measuring vibration data of a creping blade currently in use by a paper making machine using one or more vibration sensors;
    assigning a score for the process data, including assigning a vibration score for the vibration data, wherein assigning the vibration score for the vibration data comprises:
        determining an average vibration value of the creping blade currently in use by the paper making machine;
        calculating a standard deviation of the vibration data of the creping blade currently in use by the paper making machine; and
        assigning the score to the vibration data comprises based at least in part on the average vibration value of the creping blade and the standard deviation of the vibration data of the creping blade; and
    generating an index score based on the score for the process data and the vibration score for the vibration data.

2. The method of claim 1, wherein the process data further comprises product quality data.

3. The method of claim 1, further comprising:
    comparing the standard deviation to a threshold; and
    outputting a signal when the standard deviation of the vibration data exceeds the threshold.

4. The method of claim 3, wherein outputting the signal comprises outputting the signal to a display when the standard deviation of the vibration data exceeds the threshold.

5. The method of claim 3, wherein assigning the vibration score to the vibration data comprises comparing the vibration data to previous vibration data, wherein the previous vibration data is associated with at least one previously used creping blade.

6. The method of claim 5, further comprising reducing the previous vibration data to a single value per creping blade.

7. The method of claim 6, further comprising comparing the standard deviation of the vibration data to a standard deviation of previous vibration data, wherein the single value is the standard deviation of the previous vibration data.

8. The method of claim 6, wherein reducing the previous vibration data to the single value per creping blade comprises:
generating fitted vibration data by fitting a function to the vibration data;
generating a detrended function by calculating a difference between the measured vibration data and the fitted vibration data; and
calculating a standard deviation of the detrended function.

9. The method of claim 5, further comprising determining a start point and a stop point of the at least one previously used creping blade, wherein the start point corresponds to a start of use of the at least one previously used creping blade and the stop point corresponds to an end of use of the at least one previously used creping blade.

10. The method of claim 1, wherein the vibration data comprises vibration data at one or more frequencies.

11. The method of claim 1, further comprising diagnosing one or more issues with a Yankee dryer based at least in part on the vibration data.

12. The method of claim 1, wherein assigning the vibration score to the vibration data further comprises:
comparing the vibration data to a threshold; and
assigning the score to the at least one vibration value using a difference between the vibration data and the threshold,
wherein, when the vibration data exceeds the threshold, a larger difference between the vibration data and the threshold corresponds to a worse vibration score.

13. The method of claim 12, wherein the vibration score for the vibration data is associated with a color, wherein the color corresponds to the difference between the vibration data and the threshold.

14. The method of claim 1, wherein the index score comprises a combination of the vibration score for the vibration data and at least one other score for at least one other portion of the process data.

15. The method of claim 14, further comprising associating the at least one other score with one or more of a paper making process and creping blade chatter.

16. The method of claim 14, wherein the at least one other score is a score for data descriptive of one or more of:
vibration of a back side of a creping blade,
vibration of a front side of a creping blade,
a steam pressure of a Yankee dryer,
a uhle box pressure of the Yankee dryer,
properties of an adhesive coating on a Yankee dryer,
properties of a release coating on a Yankee dryer, and
a ratio of the properties of the adhesive coating and the release coating.

17. The method of claim 14, wherein generating the index score comprises
assigning a respective weight to each of the vibration score and the at least one other score; and
determining a sum of the weighted vibration score and the at least one other weighted score.

18. The method of claim 17, further comprising:
determining wherein the weight assigned to the vibration data based on operator input.

19. The method of claim 1, further comprising:
comparing the index score to a threshold; and
outputting a signal indicative of whether the index score is above the threshold or below the threshold.

20. The method of claim 1, further comprising:
determining a length of time until a creping blade should be changed using one or more of the vibration score assigned to the vibration data and the index score.

21. The method of claim 1, further comprising determining an evaluation of a performance of a Yankee dryer using the index score; and
performing an action based on the evaluation.

22. The method of claim 21, wherein the action comprises one or more of:
using the index score to prevent damage to the Yankee dryer,
determining the performance of the creping process.

23. The method of claim 1, wherein the one or more vibration sensors are located on one or more of a front side of a creping blade and a back side of a creping blade.

24. The method of claim 1, wherein the index score further comprises measurements from one or more other sensors, the one or more other sensors comprising one or more of:
an additional vibration sensor,
a temperature sensor,
a tachometer,
a pressure sensor,
a flow sensor, and
a moisture sensor.

25. The method of claim 24, further comprising:
comparing a measurement of the one or more other sensors to a threshold; and
outputting a signal indicative of whether the measurement is above or below the threshold.

26. The method of claim 1, wherein the creping blade comprises a doctor blade.

27. The method of claim 1, wherein the paper making machine is a first paper making machine, wherein the index score is associated with the first paper making machine, and wherein the method further comprises:
comparing the index score to a second index score, the second index score being associated with a second paper making machine.

28. The method of claim 1, further comprising comparing the index score to an average index score of one or more paper making machines.

29. The method of claim 1, wherein the one or more vibration sensors generate the vibration data, the vibration data comprising a series of side-to-side variation measurements over time for the creping blade during a papermaking process.

30. A system comprising:
a paper making machine comprising a creping blade;
a memory configured to store process data, wherein the process data includes vibration data;
one or more sensors configured to measure the process data, wherein measuring process data includes measuring vibration data of the creping blade currently in use by the paper making machine using one or more vibration sensors; and
one or more processors configured to:
assign a score to the process data, including assigning a vibration score for the vibration data, wherein assigning the vibration score for the vibration data comprises:
determining an average vibration value of the creping blade currently in use by the paper making machine;
calculating a standard deviation of the vibration data of the creping blade currently in use by the paper making machine; and
assigning the score to the vibration data comprises based at least in part on the average vibration value of the creping blade and the standard deviation of the vibration data of the creping blade; and generate an index score based on the score for the process data and the vibration score for the vibration data.

31. A non-transitory computer-readable storage medium having stored thereon instructions that, when executed, cause one or more processors of a computing device to:

measure process data, wherein the process data includes vibration data, and wherein measuring process data includes measuring vibration data of a creping blade currently in use by a paper making machine using one or more vibration sensors;

assign a score to the process data, including assigning a vibration score for the vibration data, wherein assigning the vibration score for the vibration data comprises:
determining an average vibration value of the creping blade currently in use by the paper making machine;
calculating a standard deviation of the vibration data of the creping blade currently in use by the paper making machine; and
assigning the score to the vibration data comprises based at least in part on the average vibration value of the creping blade and the standard deviation of the vibration data of the creping blade; and generate an index score based on the score for the process data and the vibration score for the vibration data.

32. The method of claim 21, wherein performing the action comprises:

outputting an alarm for an operator to perform maintenance on the creping blade.

* * * * *